(12) United States Patent
Elsherif

(10) Patent No.: US 11,547,221 B1
(45) Date of Patent: Jan. 10, 2023

(54) RETAIL CIGARETTE INVENTORY-MONITORING SYSTEM

(71) Applicant: Hussein Elsherif, New London, CT (US)

(72) Inventor: Hussein Elsherif, New London, CT (US)

( * ) Notice: Subject to any disclaimer, the term of this patent is extended or adjusted under 35 U.S.C. 154(b) by 80 days.

(21) Appl. No.: 17/202,915

(22) Filed: Mar. 16, 2021

(51) Int. Cl.
  *A47F 1/12* (2006.01)
  *G06K 7/14* (2006.01)

(52) U.S. Cl.
  CPC ............ *A47F 1/126* (2013.01); *G06K 7/1417* (2013.01)

(58) Field of Classification Search
  CPC ...................................................... A47F 1/126
  USPC .................. 221/4–8; 700/231–244; 211/59.3
  See application file for complete search history.

(56) References Cited

U.S. PATENT DOCUMENTS

| | | | |
|---|---|---|---|
| 4,742,936 A * | 5/1988 | Rein ........................ | A47F 1/126 211/59.3 |
| 5,649,363 A * | 7/1997 | Rankin, VI ........... | B21C 51/005 29/896.9 |
| 5,881,910 A | 3/1999 | Rein | |
| 6,105,791 A * | 8/2000 | Chaison ................... | A47F 1/126 211/59.3 |
| 7,224,762 B2 | 5/2007 | Koger | |
| D553,384 S | 10/2007 | Wilenius | |
| 7,813,973 B2 | 10/2010 | Gudbjartsson | |
| 8,260,456 B2 | 9/2012 | Siegel | |
| 8,938,396 B2 | 1/2015 | Swafford, Jr | |
| 9,773,224 B2 * | 9/2017 | Burnside .............. | G07G 1/0054 |
| 10,026,057 B1 * | 7/2018 | Elsherif ............... | G06Q 10/087 |
| 10,271,666 B2 * | 4/2019 | Taylor ..................... | A47F 1/125 |
| 2005/0040123 A1 | 2/2005 | All | |
| 2013/0144433 A1 * | 6/2013 | Lockwood .............. | G07F 9/002 700/236 |

FOREIGN PATENT DOCUMENTS

WO      2016077597      5/2016

* cited by examiner

*Primary Examiner* — Timothy R Waggoner
(74) *Attorney, Agent, or Firm* — Kyle A. Fletcher, Esq.

(57) ABSTRACT

The retail cigarette inventory management system forms a containment structure that stores one or more packs of smoking materials. The retail cigarette inventory management system counts the number of individual packs contained in the one or more packs of smoking materials. The retail cigarette inventory management system visibly displays the counted number of individual packs of the one or more packs of smoking materials contained in the retail cigarette inventory management system. The retail cigarette inventory management system visibly displays the number of individual packs contained in the one or more packs of smoking materials.

15 Claims, 3 Drawing Sheets

RETAIL CIGARETTE INVENTORY-MONITORING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and counting, more specifically, a device for counting objects in a stack.

SUMMARY OF INVENTION

The retail cigarette inventory management system is an inventory management system. The retail cigarette inventory management system is configured for use in the storage of one or more packs of smoking materials. The retail cigarette inventory management system forms a containment structure that stores the one or more packs of smoking materials. The retail cigarette inventory management system counts the number of individual packs contained in the one or more packs of smoking materials. The retail cigarette inventory management system visibly displays the counted number of individual packs of the one or more packs of smoking materials contained in the retail cigarette inventory management system. The retail cigarette inventory management system comprises a storage pan, a stack foot, and a pressure spring, and a counting mechanism. The storage pan contains the one or more packs of smoking materials. The stack foot and the pressure spring apply a force to the one or more packs of smoking materials that push the one or more packs of smoking materials to the front of the storage pan. The counting mechanism counts the number of individual packs contained in the storage pan; and, b) displays the number of individual packs contained in the storage pan.

These together with additional objects, features and advantages of the retail cigarette inventory management system will be readily apparent to those of ordinary skill in the art upon reading the following detailed description of the presently preferred, but nonetheless illustrative, embodiments when taken in conjunction with the accompanying drawings.

In this respect, before explaining the current embodiments of the retail cigarette inventory management system in detail, it is to be understood that the retail cigarette inventory management system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the retail cigarette inventory management system.

It is therefore important that the claims be regarded as including such equivalent construction insofar as they do not depart from the spirit and scope of the retail cigarette inventory management system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
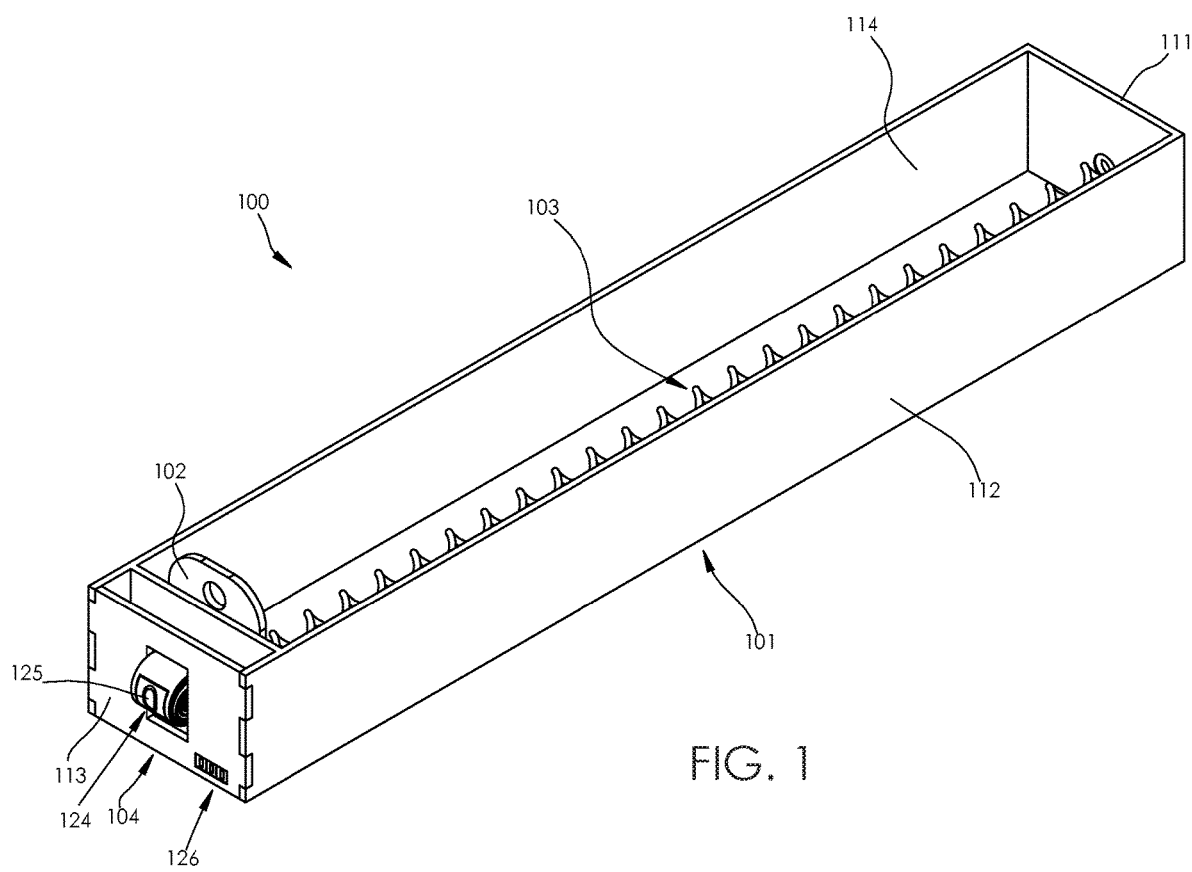
FIG. 1 is a perspective view of an embodiment of the disclosure.
Figure 2:
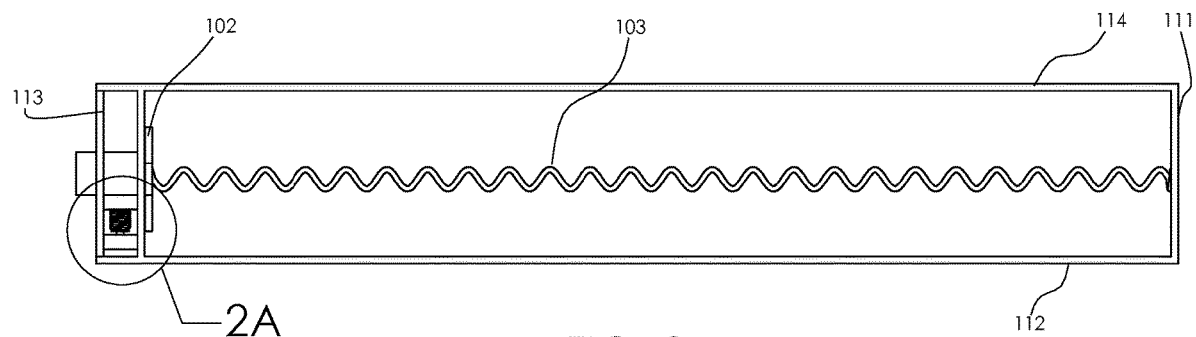
FIG. 2 is a top view of an embodiment of the disclosure.
Figure 2A:
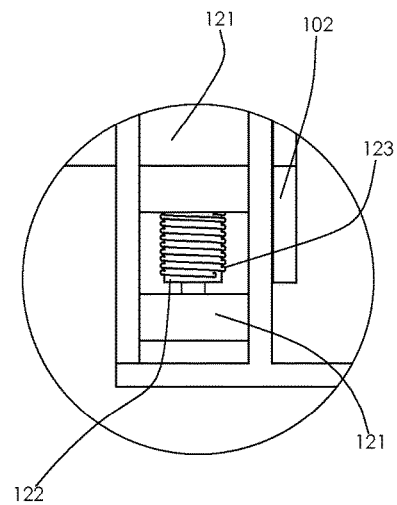
FIG. 2A is a close up detail view of the circle depicted in FIG. 2.
Figure 3:
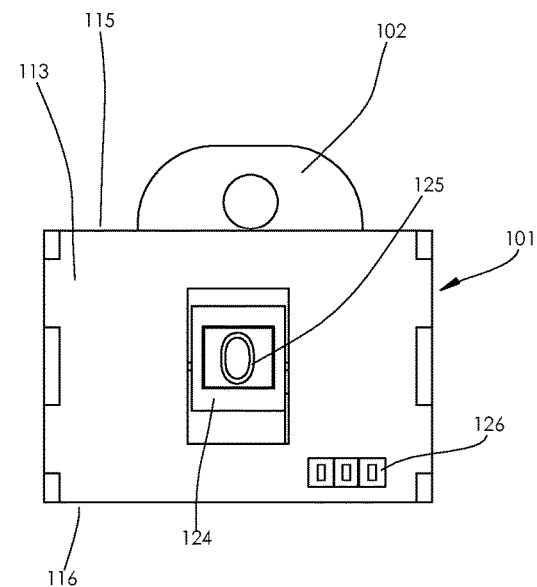
FIG. 3 is a front view of an embodiment of the disclosure.
Figure 4:
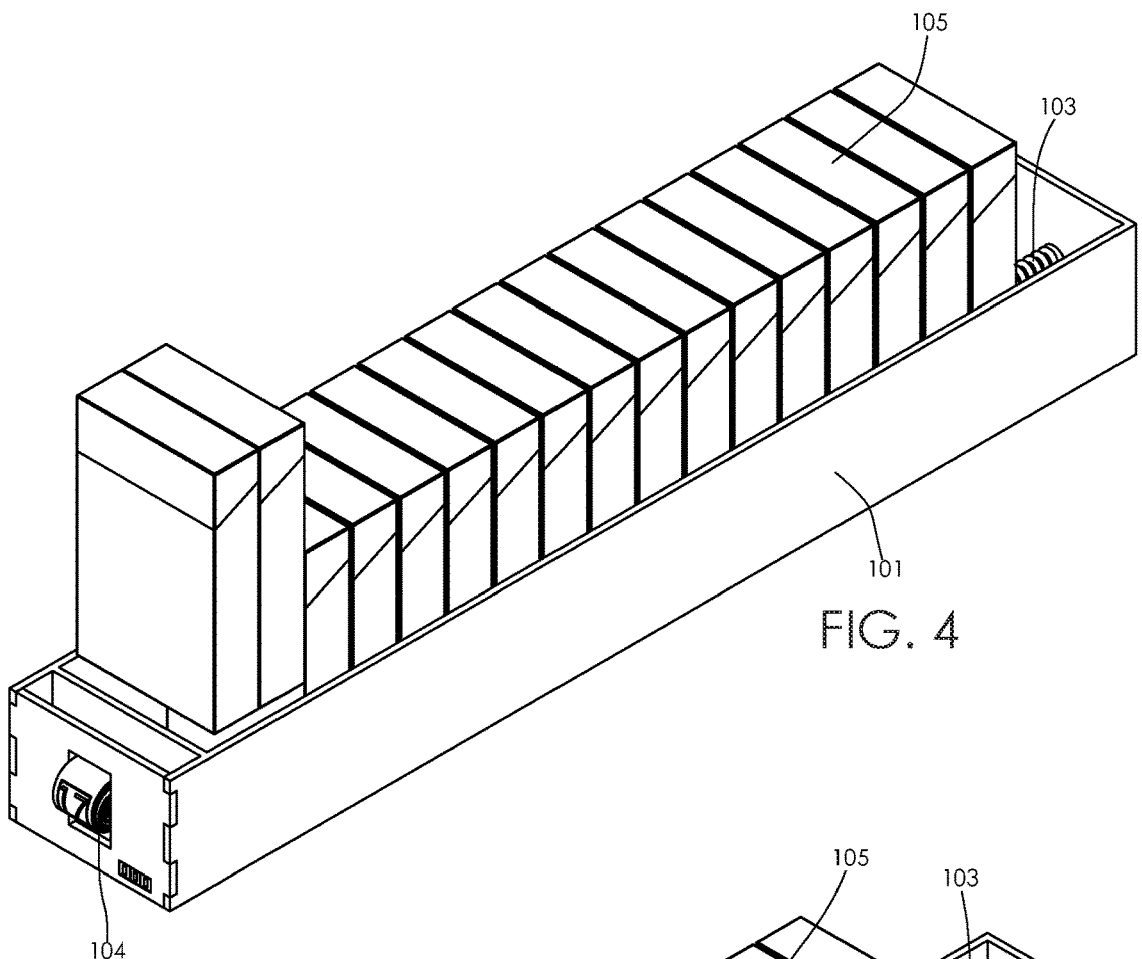
FIG. 4 is an in-use view of an embodiment of the disclosure.
Figure 5:
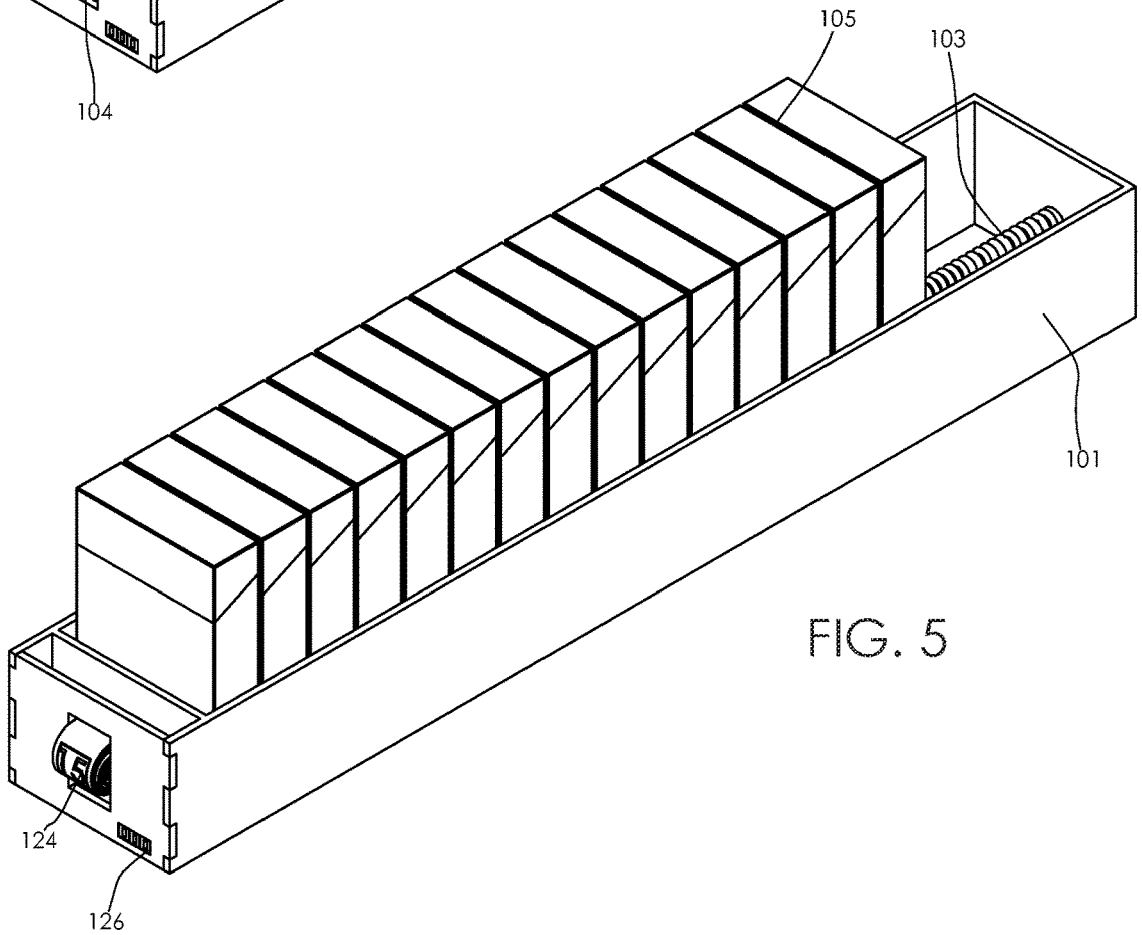
FIG. 5 is an in-use view of an embodiment of the disclosure.

Detailed reference will now be made to one or more potential embodiments of the disclosure, which are illustrated in FIGS. 1 through 5.

The retail cigarette inventory management system is an inventory management system. The invention 100 is configured for use in the storage of one or more packs of smoking materials 105. The invention 100 forms a containment structure that stores the one or more packs of smoking materials 105. The invention 100 counts the number of individual packs contained in the one or more packs of smoking materials 105. The invention 100 visibly displays the counted number of individual packs of the one or more packs of smoking materials 105 contained in the invention 100. The invention 100 comprises a storage pan 101, a stack foot 102, a pressure spring 103, and a counting mechanism 104. The storage pan 101 contains the one or more packs of smoking materials 105. The stack foot 102 and the pressure spring 103 apply a force to the one or more packs of smoking materials 105 that push the one or more packs of smoking materials 105 to the front of the storage pan 101. The counting mechanism 104: a) counts the number of individual packs contained in the storage pan; and, b) visibly displays the number of individual packs contained in the storage pan 101.

Each of the one or more packs of smoking materials 105 is a prism-shaped container used to store a smoking material. Each of the one or more packs of smoking materials 105 has a rectangular block shape. The form factor of each of the one or more packs of smoking materials 105 is identical.

The storage pan 101 is a containment structure. The storage pan 101 is configured to store the one or more packs of smoking materials 105. The storage pan 101 is a hollow prism-shaped structure. The storage pan 101 has a pan shape. In the first potential embodiment of the disclosure, the storage pan 101 has a rectangular block shape. The storage pan 101 comprises a first lateral face 111, a second lateral face 112, a third lateral face 113, a fourth lateral face 114, an open face 115, and a closed face 116.

The first lateral face 111 is the lateral face of the prism structure of the storage pan 101 with the minimum surface area. The second lateral face 112 is the lateral face of the prism structure of the storage pan 101 with the maximum surface area. The third lateral face 113 is the lateral face of the prism structure of the storage pan 101 that is distal from the first lateral face 111. The fourth lateral face 114 is the lateral face of the prism structure of the storage pan 101 that is distal from the second lateral face 112. The open face 115 is the congruent end of the prism structure of the storage pan 101 that is open. The closed face 116 is the congruent end of the prism structure of the storage pan 101 that is distal from the open face 115.

The form factor of each of the one or more packs of smoking materials 105 is sized such that each of the one or more packs of smoking materials 105 will insert into the storage pan 101 through the open face 115.

The stack foot 102 is a disk-shaped structure. The stack foot 102 inserts into the hollow interior of the pan structure of the storage pan 101. The position of the stack foot 102 is between the pressure spring 103 and the one or more packs of smoking materials 105 such that the stack foot 102 transfers the force generated by the pressure spring 103 over the surface of the one or more packs of smoking materials 105.

The pressure spring 103 is a compression spring. The pressure spring 103 is defined elsewhere in this disclosure. The pressure spring 103 attaches the stack foot 102 to the interior surface of the first lateral face 111 of the storage pan 101. The pressure spring 103 is deformed from its relaxed shape as the one or more packs of smoking materials 105 are inserted between the stack foot 102 and the third lateral face 113 of the storage pan 101. The counterforce applied by the pressure spring 103 is a function of the span of the length of the deformation of the pressure spring 103 that is caused by the insertion of the one or more packs of smoking materials 105 between the stack foot 102 and the third lateral face 113 of the storage pan 101. The pressure spring always pushes the one or more packs of smoking material 105 contained in the storage pan 101 towards the third lateral face 113 of the storage pan 101.

The counting mechanism 104 is a mechanical device. The counting mechanism mounts in the third lateral face 113 of the storage pan 101. The counting mechanism 104 measures the span of the distance between the third lateral face 113 of the storage pan 111 and the stack foot 102. The identical form factor of each of the one or more packs of smoking materials allows the counting mechanism 104 to relate the number of individual packs contained in the storage pan 101 to the measured span of distance. The counting mechanism 104 displays the count of the individual packs contained in the storage pan 101 on a display dial 144. The display dial 144 is marked with a scale that represents the number of individual packs contained in the storage pan 101. The counting mechanism 104 rotates the display dial 144 as one or more packs of smoking materials 105 are added to or removed from the storage pan 101

Because the form factors of each of the one or more packs of smoking materials 105 are identical, each individual pack of smoking material stored in the invention 100 rotates the display dial 124 by the same amount. This allows the counting mechanism 104 to count the number of individual packs stored in the storage pan such that the display dial 144 always visibly displays the number of packs of smoking materials contained in the storage pan 101.

The counting mechanism 104 comprises a roller clutch and spring 121, a spool 122, a tracking cord 123, and a display dial 124.

The roller clutch and spring 121 is a roller clutch and spring 121 system. The roller clutch and spring 121 is a mechanical system. The spool 122 attaches to the roller clutch and spring 121 such that the rotation of the roller clutch and spring 121 rotates the spool 122. The tracking cord 123 spools on the spool 122 such that the tracking cord 123 deploys from and retracts onto the spool 122. The display dial 124 attaches to the spool 122 such that the rotation of the spool 122 rotates the display dial 124.

The fixed end of the tracking cord 123 permanently attaches to the spool 122. The free end of the tracking cord 123 attaches to the stack foot 102 such that the movement of the stack foot 102 within the storage pan 101 changes the span of the distance of the amount of tracking cord 123 that is deployed from the spool 122. By changing the span of the distance of the amount of tracking cord 123 that is deployed from the spool 122, the movement of the stack foot 102 within the storage pan 101 rotates the spool 122.

The rotation of the spool 122 thereby rotates the display dial 124 such that the angle of a fixed point on the display dial 124 relative to the force of gravity changes. This display dial 124 is a disk-shaped structure. The display dial 124 mounts in the third lateral face 113 of the storage pan 101 such that a portion of the lateral face of the display dial 124 is visible from the exterior surface of the third lateral face. The lateral face of the display dial 124 is marked with a numbered scale 125. The display dial 124 attaches to the spool 122 at such an angle that the number displayed by the scale 125 corresponds to the number of individual packs that are contained within the storage pan 101.

The counting mechanism 125 further comprises a bar code 126. The bar code 126 mounts on the exterior surface of the third lateral face 113. The bar code 125 presents machine readable information that provides information that specifically identifies commercial information regarding the one or more packs of smoking materials 105 contained in the invention 100.

The roller clutch and spring 121, the spool 122, and the cord are defined elsewhere in this disclosure.

The following definitions were used in this disclosure:

Bar Code: As used in this disclosure, a bar code is a machine readable coding scheme that converts text based information presented on an object into a machine readable format.

Compression Spring: As used in this disclosure, a compression spring is a spring that resists forces attempting to compress the spring in the direction of the center axis of the spring. The compression spring will return to its original position when the compressive force is removed.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Fixed End: As used in this disclosure, a fixed end refers to the end of a cord or webbing that attaches to an object.

Force: As used in this disclosure, a force refers to a net (or unopposed) measurable interaction that changes the direction of motion of an object, the velocity of motion of an object, the momentum of an object, or the stress within an object.

Form Factor: As used in this disclosure, the term form factor refers to the size and shape of an object.

Free End: As used in this disclosure, a free end refers to the end of a cord or webbing that is not secured to an object.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein the closed end of prism structure of the pan and/or a portion of the lateral face of the pan is also open.

Pawl: As used in this disclosure, a pawl is a rotating bar or lever with a free end that engages a toothed structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Roller Clutch and Spring System: As used in this disclosure, a roller clutch and spring system is a commercially available system for storing a sheeting on a scroll or loading a cord on a spool. The sheeting is stored on a rotating cylindrical roller as the scroll. The cord is stored on the spool. The clutch portion of the roller clutch and spring system is configured to allow the rotating cylindrical roller to rotate in a first direction. The spring portion of the roller clutch and spring system is configured to return the rotating cylindrical roller to its original position when the clutch portion is released. A common example of the roller clutch and spring system is the mechanism used to raise and lower window blinds. Always use scroll cord spool clutch.

Scale: As used in this disclosure, refers to a visual system of ordered markings that are used as a reference for measurement.

Smoking Material: As used in this disclosure, smoking materials are combustible materials that are intended to be deeply inhaled as the smoking material burns. This definition is intended to include, but is not limited to, tobacco and pharmacologically active media that exhibit pharmacological activity such as marijuana. This definition is intended to include vaporizing devices commonly used to evaporate or sublimate materials into a gas phase that simulate the smoking experience. This definition is intended to exclude combustible materials that are burned as a perfume but that are generally not purposefully inhaled including, but not limited to, incense and scented oils.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stack: As used in this disclosure, a stack refers to a collection of disk-shaped objects that are stored such that the centers of each of the disk-shaped objects are aligned. The term stack typically implies that the aligned centers are vertically oriented.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all The inventor claims:

1. A retail cigarette inventory management system comprising
    a storage pan, a stack foot, and a pressure spring, and a counting mechanism;
    wherein the stack foot is contained in the storage pan;
    wherein the pressure spring is contained in the storage pan;
    wherein the pressure spring attaches the stack foot to the storage pan;
    wherein the counting mechanism attaches to the storage pan;
    wherein the counting mechanism comprises a roller clutch and spring, a spool, a tracking cord, and a display dial;
    wherein the roller clutch and spring is a roller clutch and spring system;
    wherein the spool attaches to the roller clutch and spring such that the rotation of the roller clutch and spring rotates the spool;
    wherein the tracking cord spools on the spool such that the tracking cord deploys from and retracts onto the spool;
    wherein the display dial attaches to the spool such that the rotation of the spool rotates the display dial.

2. The retail cigarette inventory management system according to claim 1
    wherein the retail cigarette inventory management system is configured for use in the storage of one or more packs of smoking materials;
    wherein the retail cigarette inventory management system forms a containment structure that stores the one or more packs of smoking materials;
    wherein the retail cigarette inventory management system counts the number of individual packs contained in the one or more packs of smoking materials;
    wherein the retail cigarette inventory management system visibly displays the counted number of individual packs of the one or more packs of smoking materials contained in the retail cigarette inventory management system;
    wherein the storage pan contains the one or more packs of smoking materials;
    wherein the stack foot and the pressure spring apply a force to the one or more packs of smoking materials that push the one or more packs of smoking materials to the front of the storage pan;
    wherein the counting mechanism: a) counts the number of individual packs of the one or more packs of smoking materials contained in the storage pan; and, visibly displays the number of individual packs contained in the storage pan.

3. The retail cigarette inventory management system according to claim 2
    wherein each of the one or more packs of smoking materials is a container used to store a smoking material;
    wherein each of the one or more packs of smoking materials has a rectangular block shape;
    wherein a form factor of each of the one or more packs of smoking materials is identical;
    wherein the retail cigarette inventory management system forms a containment structure that stores the one or more packs of smoking materials.

4. The retail cigarette inventory management system according to claim 3
    wherein the storage pan contains the one or more packs of smoking materials;
    wherein the stack foot and the pressure spring apply a force to the one or more packs of smoking materials that push the one or more packs of smoking materials to a front of the storage pan.

5. The retail cigarette inventory management system according to claim 4
    wherein the storage pan is configured to store the one or more packs of smoking materials;
    wherein the storage pan has a hollow interior;
    wherein the storage pan has a pan shape.

6. The retail cigarette inventory management system according to claim 5
    wherein the storage pan has a rectangular block shape;
    wherein the storage pan comprises a first lateral face, a second lateral face, a third lateral face, a fourth lateral face, an open face, and a closed face;
    wherein the first lateral face of the storage pan has the minimum surface area;
    wherein the second lateral face of the storage pan has the maximum surface area;
    wherein the third lateral face of the storage pan is distal from the first lateral face;
    wherein the fourth lateral face of the storage pan is distal from the second lateral face;
    wherein the open face is congruent with the storage pan and is open;
    wherein the closed face is congruent with the storage pan and is distal from the open face.

7. The retail cigarette inventory management system according to claim 6 wherein the form factor of each of the one or more packs of smoking materials is sized such that each of the one or more packs of smoking materials will insert into the storage pan through the open face.

8. The retail cigarette inventory management system according to claim 7
    wherein the stack foot is a disk-shaped structure;
    wherein the stack foot inserts into the hollow interior of the pan structure of the storage pan;
    wherein the position of the stack foot is between the pressure spring and the one or more packs of smoking materials such that the stack foot transfers the force generated by the pressure spring over the surface of the one or more packs of smoking materials.

9. The retail cigarette inventory management system according to claim 8
    wherein the pressure spring is a compression spring;
    wherein the pressure spring attaches the stack foot to an interior surface of the first lateral face of the storage pan;
    wherein the pressure spring is deformed from its relaxed shape as the one or more packs of smoking materials are inserted between the stack foot and the third lateral face of the storage pan.

10. The retail cigarette inventory management system according to claim 9
    wherein the counting mechanism is a mechanical device;
    wherein the counting mechanism mounts in the third lateral face of the storage pan;
    wherein the counting mechanism measures a span of a distance between the third lateral face of the storage pan and the stack foot.

11. The retail cigarette inventory management system according to claim 10 wherein the counting mechanism displays a count of the one or more packs of smoking material contained in the storage pan on the display dial.

12. The retail cigarette inventory management system according to claim 11
wherein the display dial is marked with a scale that represents the count of the one or more packs of smoking material contained in the storage pan;
wherein the counting mechanism rotates the display dial as one or more packs of smoking materials are added to or removed from the storage pan.

13. The retail cigarette inventory management system according to claim 12
wherein a fixed end of the tracking cord permanently attaches to the spool;
wherein a free end of the tracking cord attaches to the stack foot such that the movement of the stack foot within the storage pan changes the span of the distance of an amount of tracking cord that is deployed from the spool;
wherein by changing the span of the distance of the amount of tracking cord that is deployed from the spool, the movement of the stack foot within the storage pan rotates the spool;
wherein rotation of the spool thereby rotates the display dial such that an angle of a fixed point on the display dial changes.

14. The retail cigarette inventory management system according to claim 13
wherein this display dial is a disk-shaped structure;
wherein the display dial mounts in the third lateral face of the storage pan such that a portion of a lateral face of the display dial is visible from an exterior surface of the third lateral face;
wherein the lateral face of the display dial is marked with a numbered scale;
wherein the display dial attaches to the spool at such an angle that a number displayed by the numbered scale corresponds to the count of the one or more packs of smoking material that are contained within the storage pan.

15. The retail cigarette inventory management system according to claim 14
wherein the counting mechanism further comprises a bar code;
wherein the bar code mounts on the exterior surface of the third lateral face;
wherein the bar code presents machine readable information that provides information that specifically identifies commercial information regarding the one or more packs of smoking materials contained in the retail cigarette inventory management system.

\* \* \* \* \*